United States Patent
Matsuda et al.

(10) Patent No.: US 7,485,693 B2
(45) Date of Patent: Feb. 3, 2009

(54) PRIMER COMPOSITION FOR A FLUORINATED ELASTOMER OR A FLUORINATED GEL

(75) Inventors: Takashi Matsuda, Annaka (JP); Yasuhisa Osawa, Takasaki (JP); Kenichi Fukuda, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 416 days.

(21) Appl. No.: 11/177,304

(22) Filed: Jul. 11, 2005

(65) Prior Publication Data

US 2006/0178459 A1    Aug. 10, 2006

(30) Foreign Application Priority Data

Jul. 12, 2004    (JP)    .............................. 2004-205122
Jul.  7, 2005    (JP)    .............................. 2005-199250

(51) Int. Cl.
  *C08G 77/24*    (2006.01)
  *C08G 77/00*    (2006.01)
  *C08G 77/12*    (2006.01)
  *B32B 9/04*    (2006.01)

(52) U.S. Cl. ............................. 528/36; 528/10; 528/31; 428/447

(58) Field of Classification Search ................... 528/31, 528/36, 10
See application file for complete search history.

(56) References Cited

U.S. PATENT DOCUMENTS

| 4,287,114 | A | * | 9/1981 | Itoh et al. | 524/493 |
| 5,073,422 | A | * | 12/1991 | Konno et al. | 428/40.7 |
| 5,322,557 | A | * | 6/1994 | Inomata et al. | 106/287.14 |
| 5,532,056 | A | * | 7/1996 | Satoh et al. | 428/332 |
| 5,656,711 | A | * | 8/1997 | Fukuda et al. | 528/15 |
| 5,665,846 | A | * | 9/1997 | Sato et al. | 528/15 |
| 5,677,411 | A | * | 10/1997 | Ward et al. | 528/15 |

(Continued)

FOREIGN PATENT DOCUMENTS

EP    0 725 113 A1    8/1996

(Continued)

*Primary Examiner*—Randy Gulakowski
*Assistant Examiner*—Robert Loewe
(74) *Attorney, Agent, or Firm*—Birch, Stewart, Kolasch & Birch, LLP

(57) ABSTRACT

A primer composition for a fluorinated elastomer or a fluorinated gel, said primer composition comprising:
  100 parts by weight of (a) a linear perfluoro polyether compound having at least two alkenyl groups per molecule, a perfluoro polyether backbone having repeating units represented by the formula, —$C_aF_{2a}O$—, wherein a is an integer of from 1 to 6, and a weight average molecular weight of from 5,000 to 100,000,
  (b) an organosiloxane compound having one or more fluorine atom and at least two SiH bonds per molecule, in such an amount that a molar ratio of the SiH bond in the organosiloxane compound to the alkenyl group in Component (a) ranges from 0.8 to 5.0,
  a catalytic amount of (c) a hydrosilylation catalyst,
  5 to 100 parts by weight of (d) an organosiloxane compound having, per molecule, at least one SiH bond and at least one epoxy group and/or trialkoxysilyl group bonded to a silicon atom of said organosiloxane via an organic group which may have an oxygen atom, and
100 to 10000 parts by weight, per total 100 parts by weight of said components (a), (b), (c) and (d), of (e) an organic solvent having a fluorine atom and a boiling point of not higher than 150° C. at atmospheric pressure.

10 Claims, 2 Drawing Sheets

U.S. PATENT DOCUMENTS

| | | | |
|---|---|---|---|
| 5,743,951 A * | 4/1998 | Ozai et al. | 106/287.11 |
| 6,121,359 A * | 9/2000 | Fujiki et al. | 524/440 |
| 6,417,311 B1 | 7/2002 | Fukuda et al. | |
| 6,517,946 B2 * | 2/2003 | Shiono et al. | 428/450 |
| 6,576,737 B2 | 6/2003 | Shiono et al. | |
| 6,756,127 B2 * | 6/2004 | Kuroda et al. | 428/447 |
| 7,081,508 B2 * | 7/2006 | Matsuda et al. | 528/42 |
| 2002/0028903 A1 * | 3/2002 | Yamaguchi et al. | 528/42 |
| 2002/0105728 A1 * | 8/2002 | Yamaguchi et al. | 359/580 |
| 2002/0193503 A1 * | 12/2002 | Shiono et al. | 524/588 |

FOREIGN PATENT DOCUMENTS

| | | |
|---|---|---|
| EP | 0 765 916 A2 | 4/1997 |
| JP | 9-95615 A | 4/1997 |
| JP | 2001-72868 A | 3/2001 |
| JP | 2002-105319 A | 4/2002 |
| JP | 2002-194220 A | 7/2002 |

\* cited by examiner

PRIMER COMPOSITION FOR A FLUORINATED ELASTOMER OR A FLUORINATED GEL

CROSS REFERENCES

This application claims benefits of Japanese Patent Applications No. 2004-205122 filed on Jul. 12, 2004 and No. 2005-199250, filed on Jul. 7, 2005, the contents of which are hereby incorporated by reference.

TECHNICAL FIELD

The present invention related to a primer composition to bond a fluorinated elastomer or a fluorinated gel to various kinds of substrate made of an inorganic material such as metal or glass, or an organic material such as plastic.

BACKGROUND OF THE INVENTION

A heat curable elastomer or gel composition mainly composed of a polymer having at least two alkenyl groups per molecule and a perfluoro polyether backbone gives a cured product which is highly resistant to heat, chemicals, solvents and water. The cured product also has a good releasing property and, naturally, does not adhere to a substrate well.

To improve adhesion of the aforesaid compositions without sacrificing their good properties, a primer may be applied to a substrate before applying the compositions.

Various primers are commercially available, for example, a silane primer mainly composed of a silane coupling agent, and a primer mainly composed of a polymer such as a synthetic rubber, acrylic resin, urethane resin, or epoxy resin. However, these primers do not bond the aforesaid heat curable elastomer or gel composition satisfactorily because they have poor affinity with the composition, so that they do now wet the compositions well at the interface between the primer and the composition.

A heat curable fluorinated elastomer and a heat curable fluorinated elastomer gel compositions are known which have improved adhesion by containing components which function like primers.

For example, Japanese Patent Application Laid-Open No. H9-95615 discloses a heat curable fluorinated composition comprising (A) a fluorine-containing amide compound having vinyl groups at both ends and a perfluoropolyether backbone, (B) a fluorine-containing organohydrogensiloxane having at least one perfluoroxyalkyl, perfluoroalkyl, perfluoroxyalkylene or perfluoroalkylene group and two hydroxysilyl group per molecule, (C) a catalytic amount of a platinum metal compound, and (D) an organosiloxane having at least one epoxy group and/or trialkoxysilyl group bonded to a silicon atom via a carbon atom or a carbon atom and an oxygen atom. A cured product is resistant to solvent, chemicals, heat and a low temperature and humidity. Further, by heating at a relatively low temperature for a relatively short period of time, the composition gives a cured product strongly adhered to a metal or plastic.

Japanese Patent Application Laid-Open No. 2001-72868 discloses a curable fluorinated elastomer composition comprising, in addition to the aforesaid components (A) to (D), a carboxylic acid anhydride. Cured composition adheres well to various kinds of substrates, especially to PPS and polyamide and therefore useful as an adhesive for articles such as a case made of PPS or polyamide.

Japanese Patent Application Laid-Open No. 2002-105319 discloses a curable composition comprising, in addition to the aforesaid components (A) to (D), (E) an organosiloxane having at least one SiH bond, at least one cyclic carboxylic acid anhydride residue bonded to a silicon atom via a carbon atom, or at least one perfluoroxyalkyl group or perfluoroalkyl group bonded to a silicon atom via a carbon atom per molecule. Cured composition adheres well to various kinds of substrates, especially to PPS, polyamide, and polyimide and therefore useful as an adhesive for articles such as automobile parts, electric or electronic parts made of these plastic.

Japanese Patent Application Laid-Open No. 2002-194220 discloses a curable gel composition which strongly adheres to a substrate when cured. The composition comprises, in addition to the aforesaid components (A) to (D), (E) a carboxylic acid anhydride. Cured composition, which is a fluorinated gel, adheres well to various kinds of substrates, especially PPS and PBT and therefore useful as adhesive for articles such as a case made of PPS or PBT.

The aforesaid heat curable elastomer or gel compositions can be bonded to various substrates such as metals, glass, ceramics and plastics, by containing adhesion-enhancing components having an alkoxysilyl group, an epoxy group, a carboxyl group or acid anhydride residue.

However, these adhesion-enhancing components, when contained in a fluorinated elastomer, tend to degrade mechanical strength or compression permanent set of the elastomer. In a heat curable fluorinated gel, these components tend to change hardness, determined by penetration of a needle, of a cured product with time, indicating that the cured product hardens to be more brittle.

SUMMARY OF THE INVENTION

An object of the present invention is to solve the aforesaid problems caused by the adhesion-enhancing components contained in an elastomer or gel composition.

Thus, the present invention is a primer composition for a fluorinated elastomer or a fluorinated gel, said primer composition comprising:

100 parts by weight of (a) a linear perfluoro polyether compound having at least two alkenyl groups per molecule, a perfluoro polyether backbone having repeating units represented by the formula, —$C_aF_{2a}O$—, wherein a is an integer of from 1 to 6, and a weight average molecular weight of from 5,000 to 100,000, (b) an organosiloxane compound having one or more fluorine atom and at least two SiH bonds per molecule, in such an amount that a molar ratio of the SiH bond in the organosiloxane compound to the alkenyl group in Component (a) ranges from 0.8 to 5.0, a catalytic amount of (c) a hydrosilylation catalyst, 5 to 100 parts by weight of (d) an organosiloxane compound having, per molecule, at least one SiH bond and at least one epoxy group and/or trialkoxysilyl group bonded to a silicon atom of said organosiloxane via an organic group which may have an oxygen atom, and 100 to 10,000 parts by weight, per total 100 parts by weight of said components (a), (b), (c) and (d), of (e) an organic solvent having a fluorine atom and a boiling point of not higher than 150° C. at atmospheric pressure.

The aforesaid primer composition of the present invention bonds a fluorinated elastomer or gel to various kinds of substrate without causing the aforesaid problems.

DETAILED DESCRIPTION OF THE INVENTION

Figure 1:
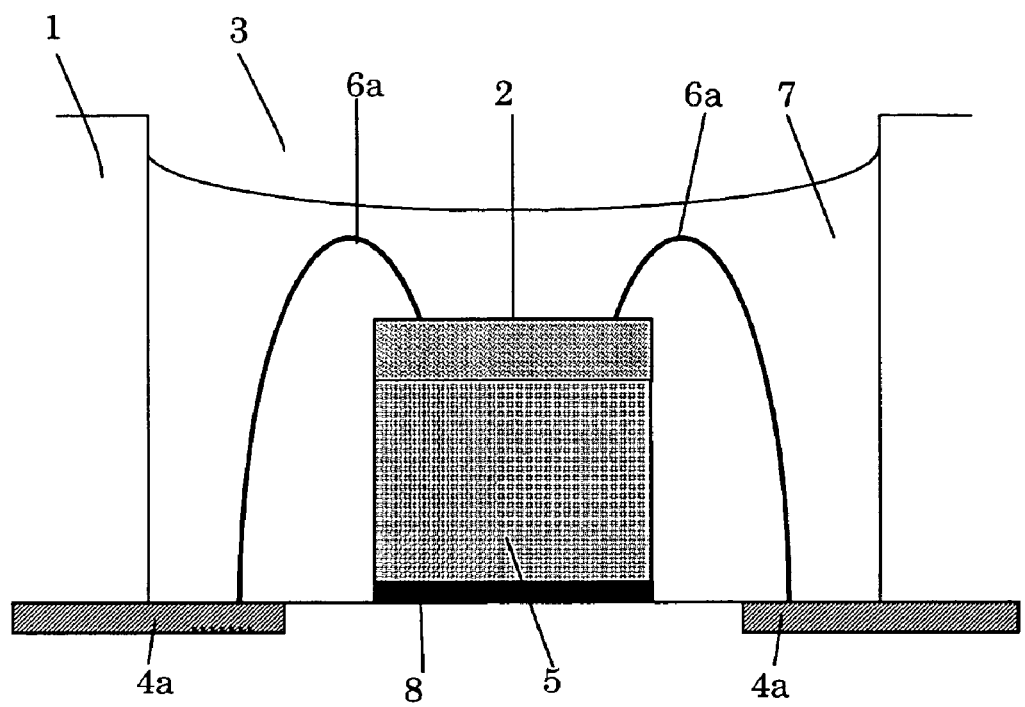
FIG. 1 is a cross sectional view of the electronic part prepared in Comparative Example 2-1.

The present composition will be explained in detail below.

Component (a)

In the present invention, Component (a) is a linear perfluoro polyether compound having at least two alkenyl groups per molecule, a perfluoro polyether backbone, preferably a divalent perfluoro alkyl ether group, and a weight average molecular weight of from 5,000 to 100,000.

The perfluoro alkyl ether backbone has many repeating units each represented by the following formula, —$C_aF_{2a}$O— wherein a may be different from unit to unit and is an integer of from 1 to 6. An exemplary perfluoro alkyl ether backbone is represented by the following formula (2), —$(C_aF_{2a}O)_q$—      (2)

wherein q is an integer of from 20 to 600, preferably 30 to 400, more preferably 30 to 200.

Examples of the repeating unit, —$C_aF_{2a}$O—, are as shown below. The perfluoro alkyl ether backbone may be composed of identical repeating units or two or more different types of repeating units.

—$CF_2$O—
—$CF_2CF_2$O—
—$CF_2CF_2CF_2$O—
—$CF(CF_3)CF_2$O—
—$CF_2CF_2CF_2CF_2$O—
—$CF_2CF_2CF_2CF_2CF_2CF_2$O—
—$C(CF_3)_2$O—

Among the repeating units shown above, the followings are preferred.

—$CF_2$O—
—$CF_2CF_2$O—
—$CF_2CF_2CF_2$O—
—$CF(CF_3)CF_2$O—

Preferred alkenyl group in the linear perfluoro polyether compound (a) has 2 to 8 carbon atoms, particularly 2 to 6 carbon atoms, and has an unsaturated group, $CH_2$=CH—, at an end. Examples of the alkenyl group include a vinyl, allyl, propenyl, isopropenyl, butenyl, and hexenyl groups among which those having the unsaturated group, $CH_2$=CH—, at an end, particularly a vinyl and allyl group, are preferred.

Examples of the polyfluoro dialkenyl compound of Component (a) are as shown below.

$CH_2$=CH—(X)$_p$—Rf$^1$-(X')$_p$—CH=CH$_2$      (3)

$CH_2$=CH—(X)$_p$-Q-Rf$^1$—Q-(X')$_p$—CH=CH$_2$      (4)

wherein X may be the same or different from each other and is a group represented by the formula, —$CH_2$—, —$CH_2$O—, —$CH_2OCH_2$— or —Y—NR$^1$—CO—, wherein Y is —$CH_2$— or an o-, m-, or p-dimethylsilylphenylene group represented by the following formula (Z) and R$^1$ is a hydrogen atom, a methyl, phenyl or allyl group, (Z)
[Structure: —Si(CH$_3$)$_2$—phenylene]

X' may be the same or different from each other and is a group represented by —$CH_2$—, —$OCH_2$—, —$CH_2OCH_2$ or —CO—NR$^2$—Y'—, wherein Y' is —$CH_2$— or an o-, m-, or p-dimethylsilylphenylene group represented by the following formula (Z') and R$^2$ is a hydrogen atom, a methyl, phenyl or allyl group, (Z')
[Structure: phenylene—Si(CH$_3$)$_2$—]

Rf$^1$ is a divalent perfluoropolyether moiety, preferably having aforesaid repeating unit represented by the formula (3), —$(C_aF_{2a}O)_q$—.

Q is a divalent hydrocarbon group having 1 to 15 carbon atoms and may have an ether bond, of which examples include an alkylene group and an alkylene group having an ether bond, and p may be the same or different from each other and is an integer of 0 or 1.

Preferred example of the linear perfluoro polyether compound (a) is as shown below.

$CH_2$=CH—(X)$_p$—CF(CF$_3$)—(O—CF$_2$—CF(CF$_3$))$_m$—O—(CF$_2$)$_r$—O—(CF(CF$_3$)—CF$_2$—O)$_n$—CF(CF$_3$)—(X')$_p$—CH=CH$_2$      (1)

wherein X, X' and p are as defined above, r is an integer of from 2 to 6, m and n are integers of from 0 to 600 with a sum of n and m ranging from 20 to 600.

The linear perfluoro polyether compound of the formula (1) preferably has a weight average molecular weight of from 5,000 to 100,000, particularly from 5,000 to 50,000. A linear perfluoro polyether compound having a weight average molecular weight smaller than the aforesaid lower limit may not provide required chemical resistance to a cured composition. On the other hand, a linear perfluoro polyether compound having a weight average molecular weight larger than the aforesaid higher limit may be less compatible with other components.

Examples of the linear perfluoro polyether compound (a) represented by the formula (1) are as shown below.

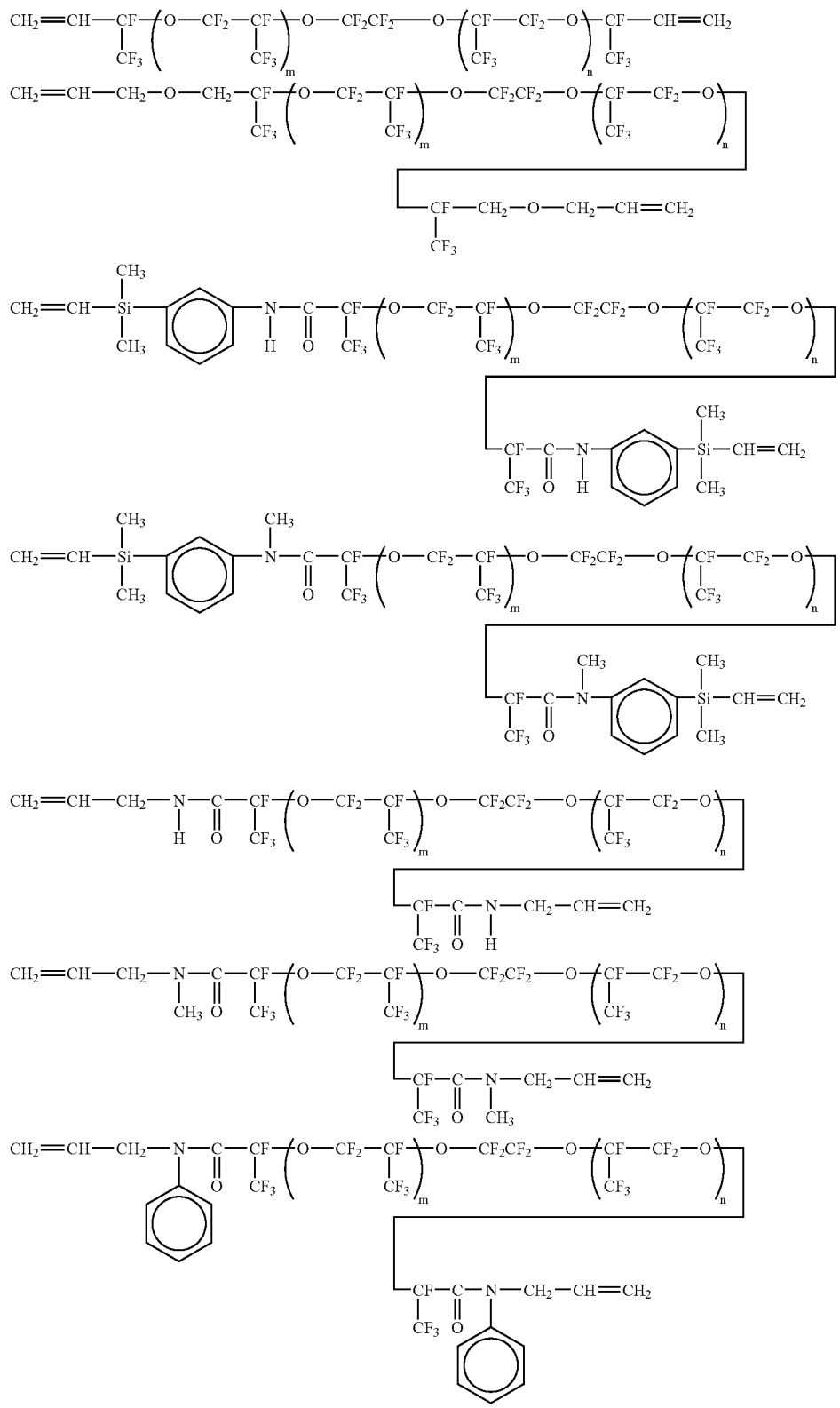
wherein m and n are as defined above.
Component (a) may be a mixture of two or more of the aforesaid linear perfluoro polyether compounds.
Component (b)
The organosiloxane compound having one or more fluorine atom, hereinafter referred to as the fluorine-containing organosiloxane, as Component (b) functions as a crosslinking agent and/or a chain extender of the aforesaid component (a). The fluorine-containing organosiloxane (b) may have at least one perfluoroalkyl, perfluoroxyalkyl, perfluoroalkylene or perfluoroxyalkylene group and at least two, preferably at least three, SiH bonds per molecule.

Examples of the aforesaid perfluoroalkyl group, perfluoroxyalkyl group, perfluoroalkylene group, and perfluoroxyalkyl groups are as shown below.

$C_gF_{2g+1}$— wherein g is an integer of from 1 to 20, preferably from 2 to 10;

—$C_gF_{2g}$— wherein g is an integer of from 1 to 20, preferably from 2 to 10;

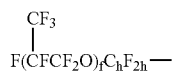

wherein f is an integer of from 2 to 200, preferably from 2 to 100, and h is an integer of from 1 to 3;

wherein each of i and j is an integer of 1 or larger with an average of i+j ranging from 2 to 200, preferably from 2 to 100; and —$(CF_2O)_c$—$(CF_2CF_2O)_d$—$CF_2$— wherein each of c and d is an integer of from 1 to 50.

The perfluoroalkyl group, perfluoroxyalkyl group, perfluoroalkylene group, and perfluoroxyalkyl groups may be bonded to a silicon atom directly or via a divalent group. Examples of the divalent group include as an alkylene group, an arylene group and a combination thereof, which may have an ether bond, an amide bond or a carbonyl group. The divalent group preferably has 2 to 12 carbon atoms as shown below wherein "Ph" represents a phenyl group.

—$CH_2CH_2$—
—$CH_2CH_2CH_2$—
—$CH_2CH_2CH_2OCH_2$—
—$CH_2CH_2CH_2$—NH—CO—
—$CH_2CH_2CH_2$—N(Ph)—CO—
—$CH_2CH_2CH_2$—N($CH_3$)—CO—
—$CH_2CH_2CH_2$—O—CO—

In addition to the aforesaid fluorine-containing group, the fluorine-containing organosiloxane as component (b) may have monovalent groups which may be substituted and have 1 to 20 carbon atoms, for example, alkyl groups such as a methyl, ethyl, propyl, butyl, hexyl, cyclohexyl, octyl, and decyl groups; aryl groups such as a phenyl, tolyl and naphthyl group; aralkyl groups such as a benzyl and phenethyl groups; and monovalent groups having substituent groups, for example, a chloromethyl, chloropropyl, and cyanoethyl groups.

The fluorine-containing organosiloxane as component (b) may be of a cyclic, linear or three-dimensional network structure. The number of silicon atom in the fluorine-containing organohydrogensiloxane (b) is not limited to a particular one but, typically, ranges from 2 to 60, preferably from 3 to 30.

Examples of the fluorine-containing organosiloxane (b) are as shown below, one or a mixture of two or more of which may be used in the present composition. In the formulae below, Me represents a methyl group and Ph represents a phenyl group.

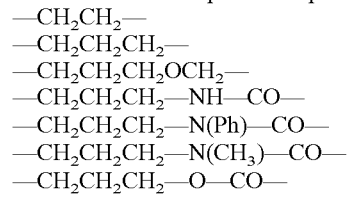

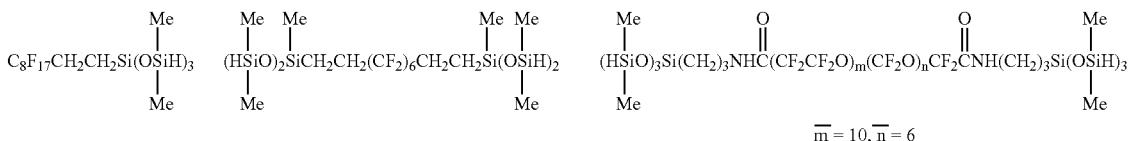

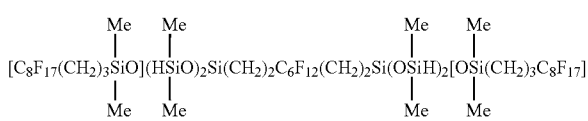

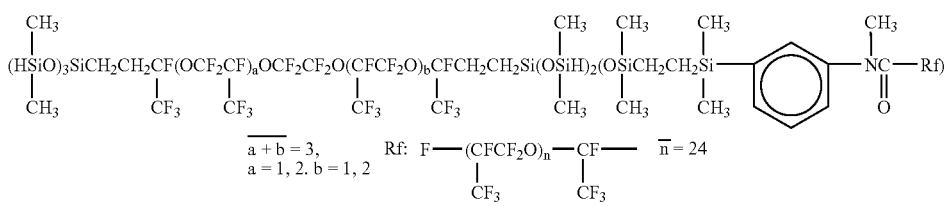

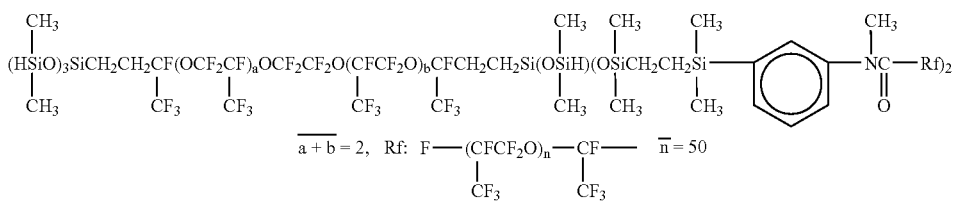

-continued
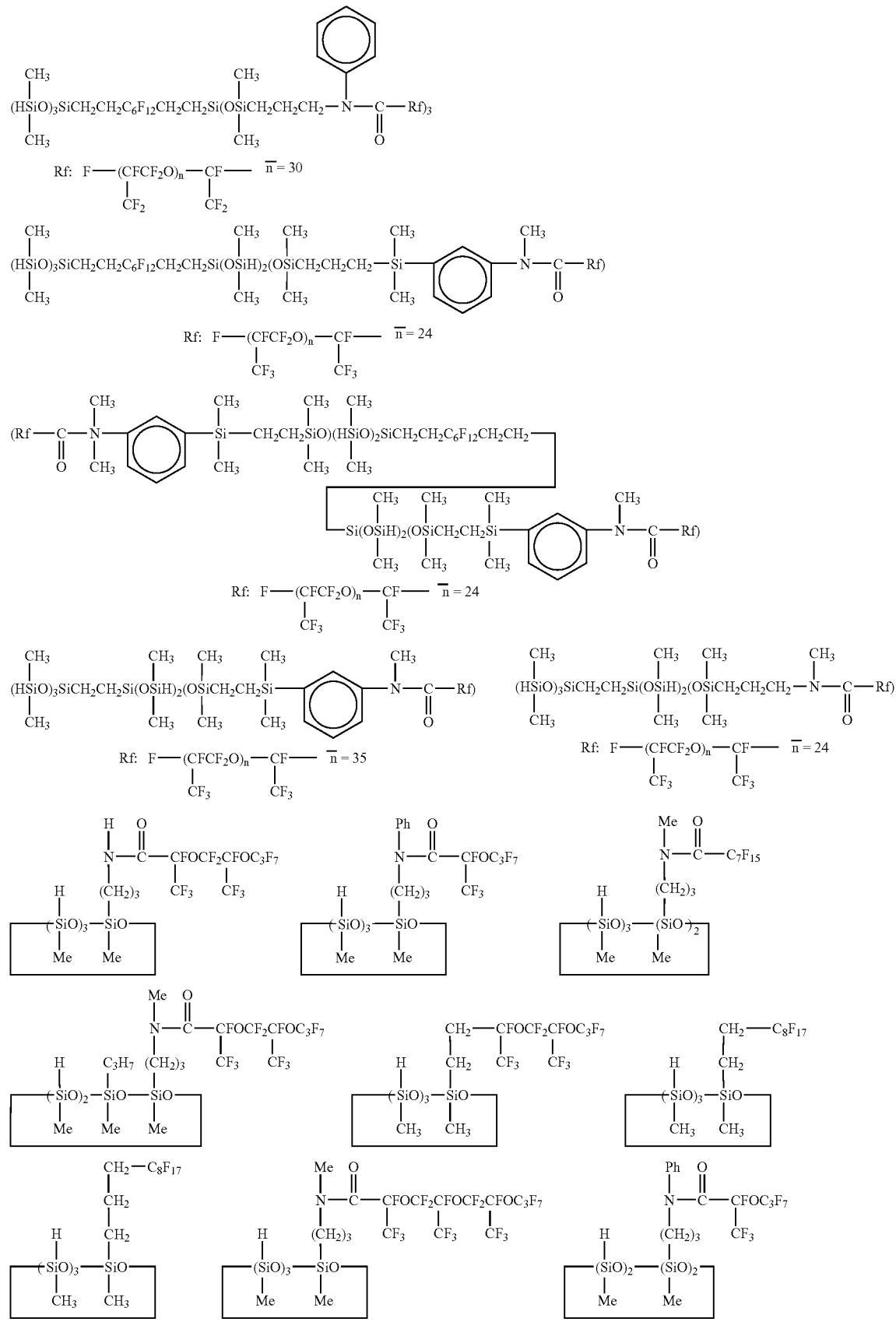

-continued
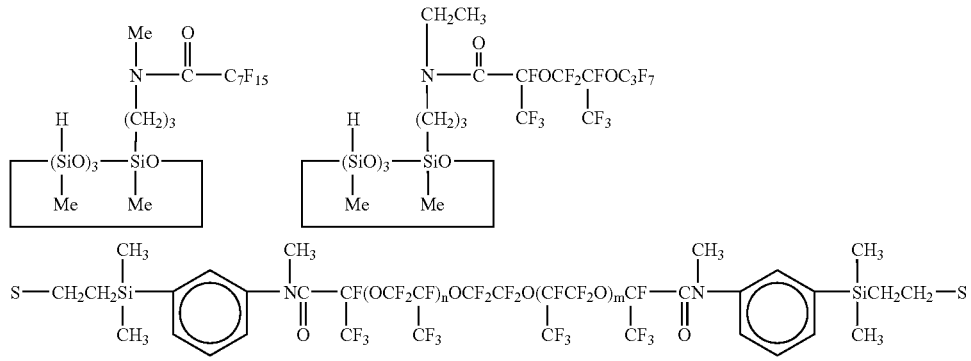
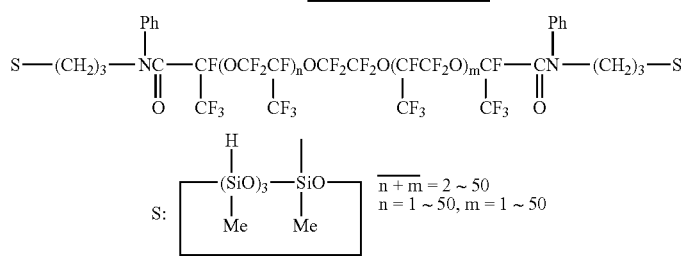
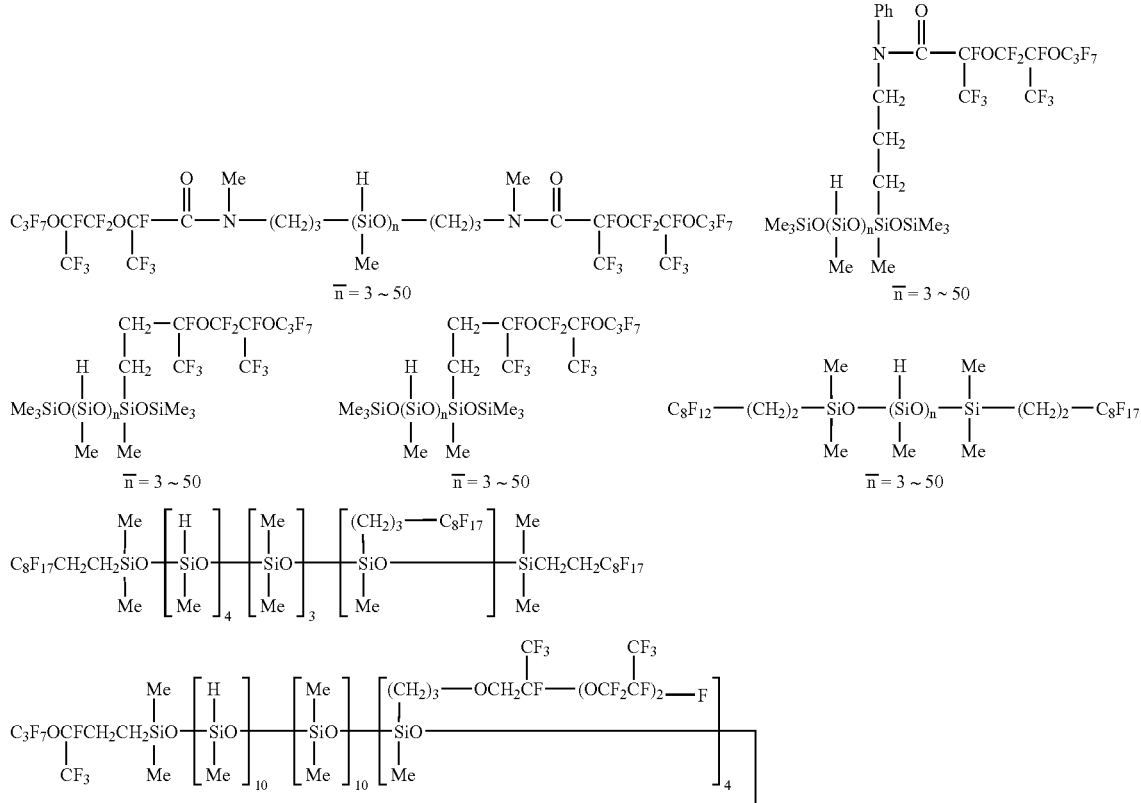
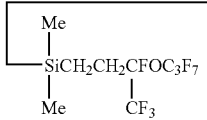

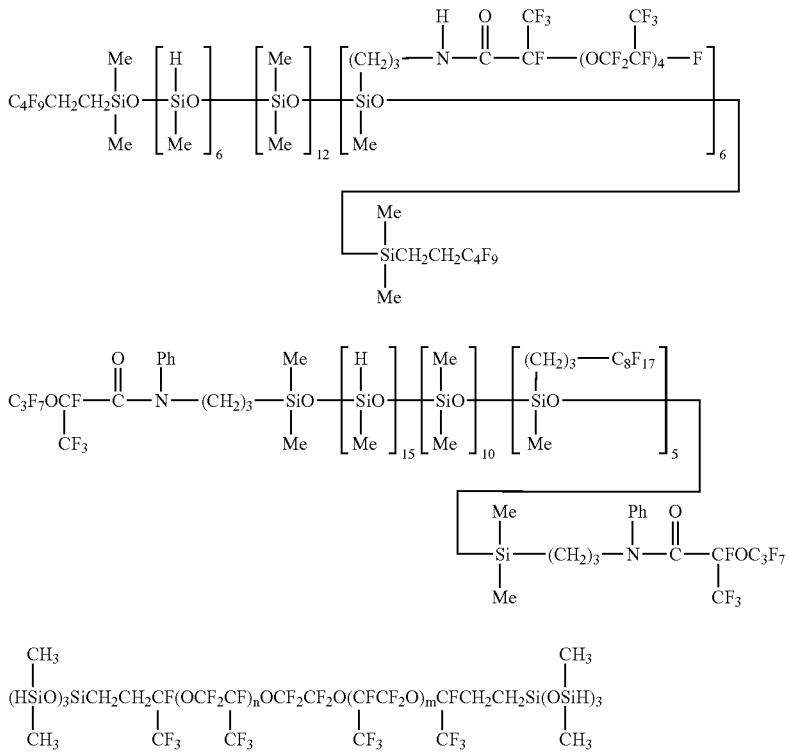
wherein n and m are integers of from 1 to 50 with n+m ranging from 2 to 50.
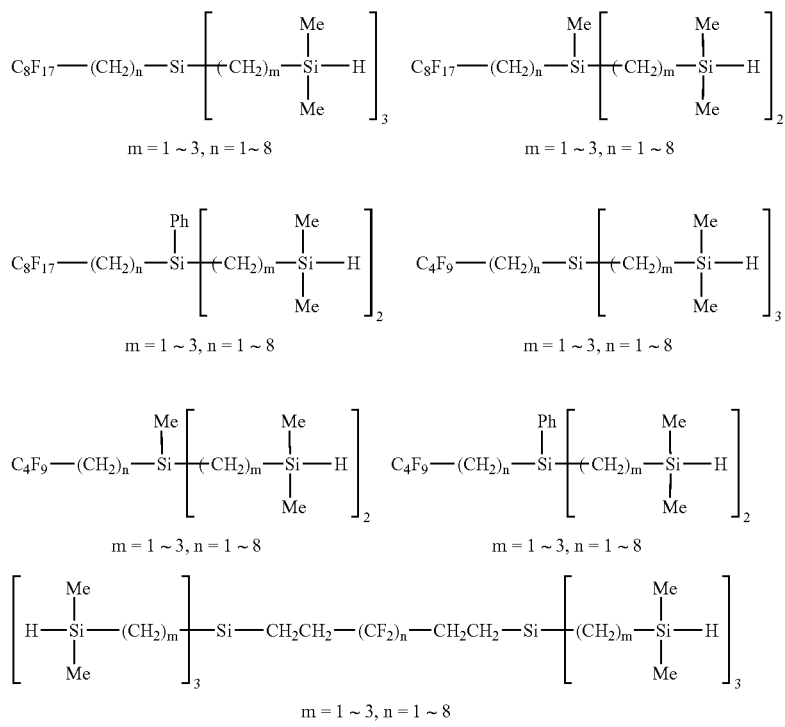

-continued
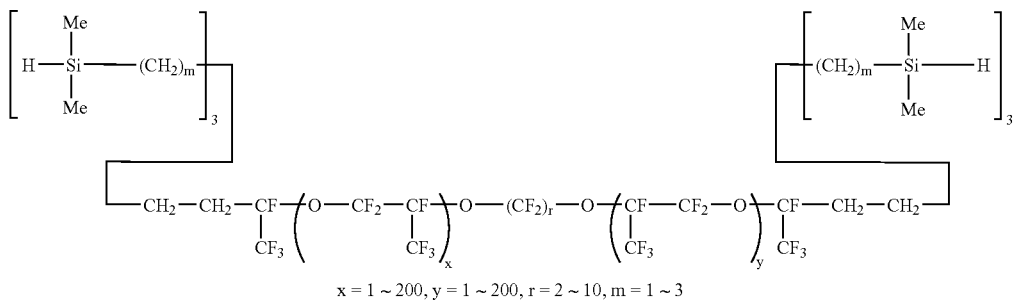
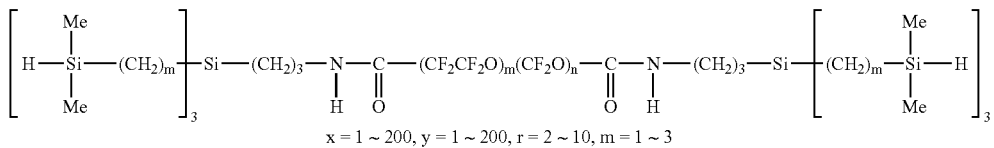
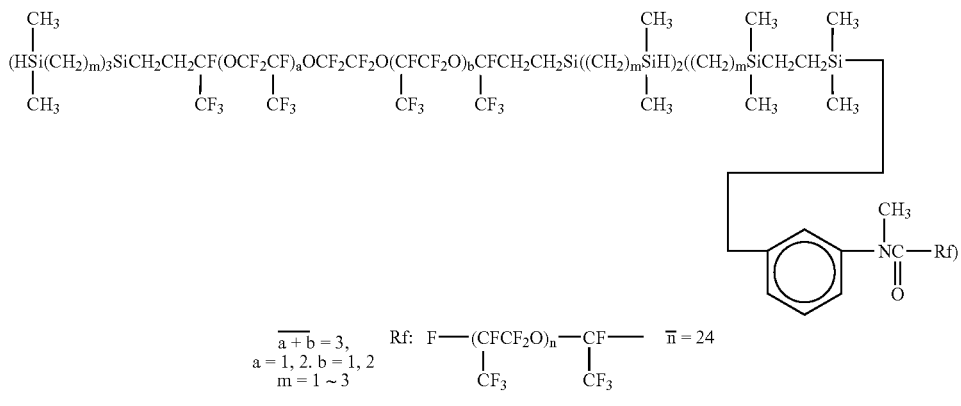
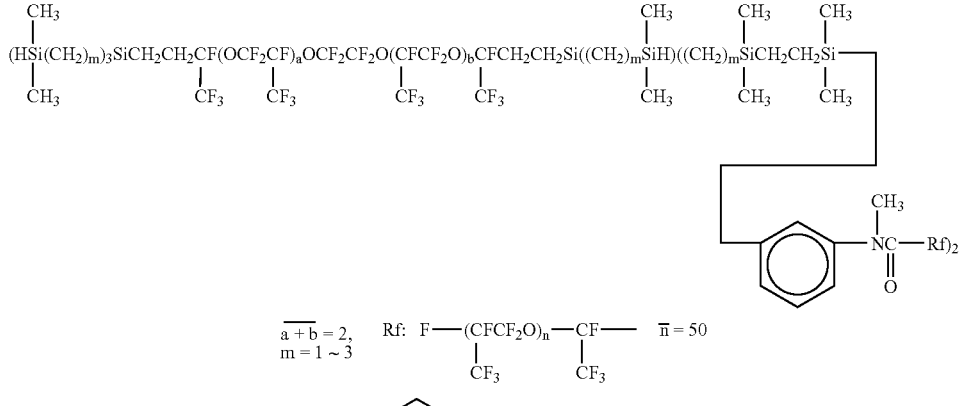
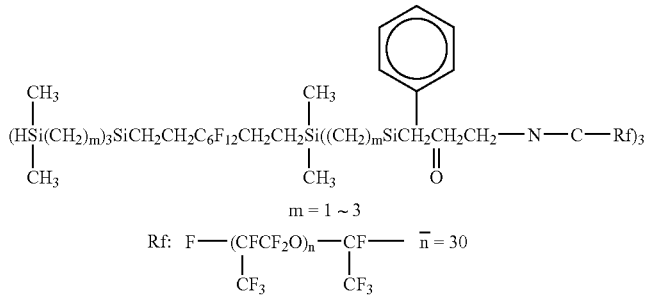

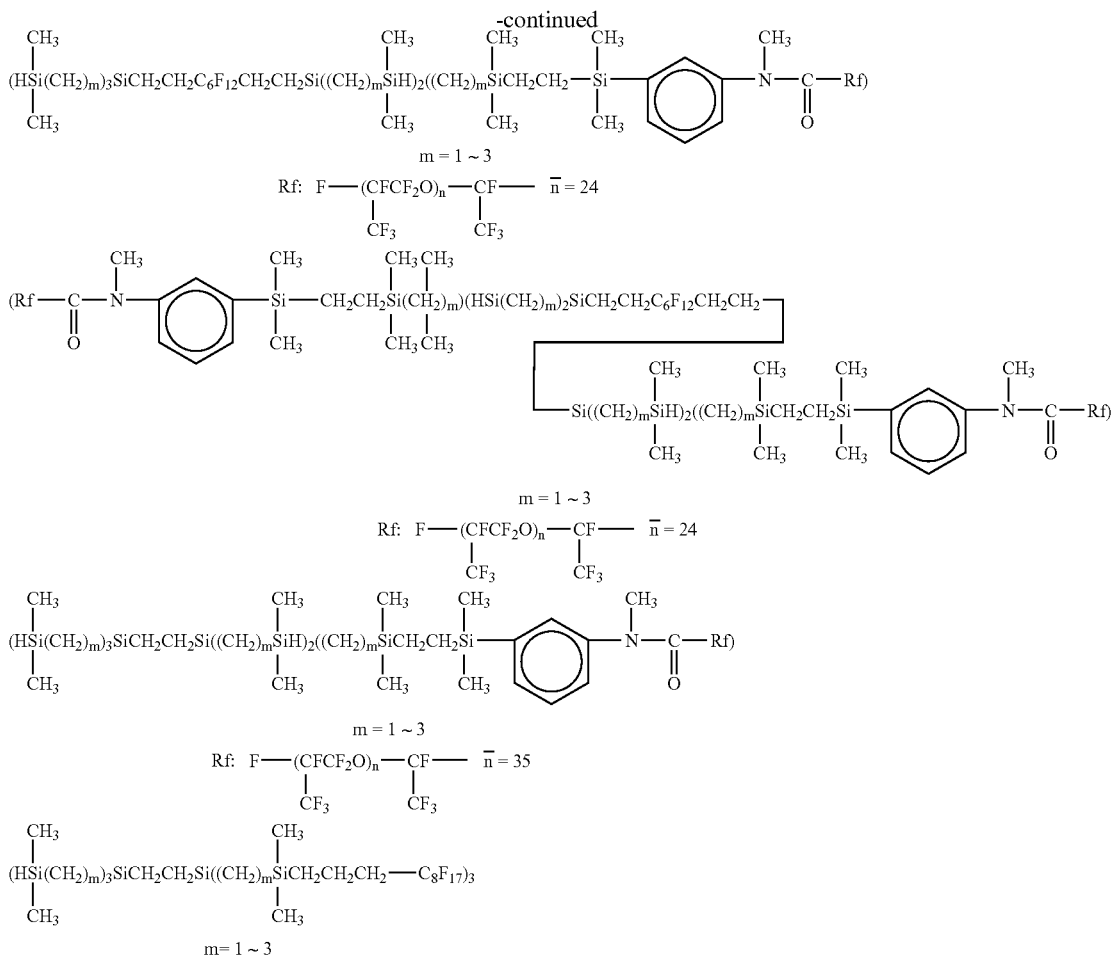

Component (b) is incorporated in the present composition in such an amount that a molar ratio of the SiH bond to the alkenyl group, such as a vinyl, allyl or cycloalkenyl group in Component (a) ranges from 0.8 to 5.0, preferably from 0.8 to 2.0. If the ratio is too low, a cured product may not be strong enough due to a low degree of crosslinking. If the ratio is too high, a cured product as a primer layer may not be strong enough, either. Component (b) may consists of one type of compound or a mixture of two or more compounds.

Component (c)

As the hydrosilylation catalyst as Component (c), a transition metal, for example, a platinum group metal such as Pt, Rh, Pd or a compound thereof is preferably used. In the present invention, platinum compounds are preferably used because of their reasonable price compared with other noble metal compounds. Examples of the platinum compound include chloroplatinic acid, a complex of chloroplatinic acid with an olefin such as ethylene, an alcohol or a vinylsiloxane, and platinum atom deposited on silica, alumina or carbon.

Examples of platinum group metal compounds other than the platinum compounds include compounds of rhodium, ruthenium, iridium and palladium such as $RhCl(PPh_3)_3$, $RhCl(CO)(PPh_3)_2$, $RhCl(C_2H_4)_2$, $Ru_3(CO)_{12}$, $IrCl(CO)(PPh_3)_2$, $Pd(PPh_3)_4$, wherein Ph represents a phenyl group. The amount of the catalyst to be used is a catalytic amount, that is, a minimum amount sufficient to attain a desired cure rate.

Typically, such amount calculated as platinum metal preferably ranges from 0.1 to 1,000 ppm, more preferably from 0.1 to 500 ppm.

Component (d)

Component (d) enhances adhesion of the present primer composition both to various kinds of substrates and to a fluorinated elastomer or a fluorinated gel. Component (d) is an organosiloxane compound having, per molecule, at least one SiH bond and at least one epoxy group and/or trialkoxysilyl group bonded to a silicon atom of the organosiloxane via an organic group which may have an oxygen atom.

The organosiloxane (d) may be prepared by subjecting an organohydrogenpolysiloxane having at least three SiH bonds per molecule, a compound having a trialkoxysilyl group and a unsaturated aliphatic group and/or a compound having an epoxy group and a unsaturated aliphatic group such as allyl glycidyl ether, and, optionally, a compound having a perfluoroalkyl group or perfluoroxyalkyl group and a unsaturated aliphatic group to a partial addition reaction.

It should be noted that a total number of the unsaturated aliphatic group should be smaller than that of the SiH bond of the organosiloxane (d). After the reaction completes, an intended reaction product may be isolated. Alternatively, a mixture may be used after treating a reaction mixture to remove unreacted compounds and an addition-reaction catalyst.

Examples of the alkoxy group include lower alkoxy groups such as a methoxy, ethoxy, n-propoxy, and i-propoxy groups among which a methoxy group is preferred.

Component (d) is incorporated in the composition in an amount of from 5 to 100 pars by weight, preferably 5 to 50 parts by weight, per 100 parts by weight of Component (a). If the content is below the aforesaid lower limit, satisfactory adhesion to a fluorinated elastomer or a fluorinated gel may not be attained. If the content exceeds the aforesaid upper limit, a cured layer may not have strength required for a primer layer.

The organosiloxane may be cyclic, linear, branched or a combination thereof. Examples of the organosiloxane of Component (d) are as shown below.

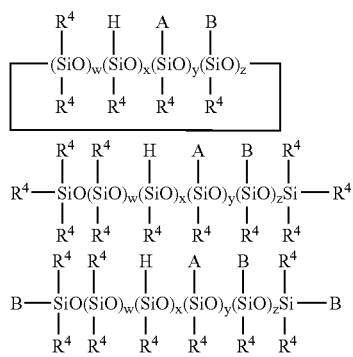

wherein $R^4$ is a monovalent hydrocarbon group which may be halogenated, A and B are as defied below, w represents a number with $0 \leq w \leq 100$, x represents a number with $1 \leq x \leq 100$, y represents a number with $1 \leq y \leq 100$ and z represents a number with $0 \leq z \leq 100$.

Preferably, $R^4$ is a monovalent hydrocarbon group, which may be halogenated, having 1 to 10, particularly 1 to 8, carbon atoms, for example, an alkyl group such as a methyl, ethyl, propyl, butyl, hexyl, cyclohexyl, or octyl group; an aryl group such as a phenyl or tolyl group; an aralkyl group such as a phenylethyl group; or a partly or wholly halogenated monovalent group thereof with a fluorine atom, among which a methyl group is most preferred.

In the above formulae, preferred numerical ranges for w, x, y and z are, $0 \leq w \leq 20$, $1 \leq x \leq 20$, $1 \leq y \leq 20$ and $0 \leq z \leq 20$, with $3 \leq w+x+y+z \leq 50$.

In the above formulae, A is an epoxy group and/or trialkoxysilyl group bonded to a silicon atom via an organic group which may have an oxygen atom. Examples of A are as shown below.

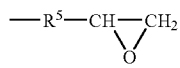

wherein $R^5$ is a divalent hydrocarbon group, such as an alkylene or a cycloalkylene group, which may have an oxygen atom and has 1 to 10, particularly 1 to 5, carbon atoms;

wherein $R^6$ is a divalent hydrocarbon group, such as an alkylene group, having 1 to 10, particularly 1 to 4, carbon atoms such, and $R^7$ is a monovalent hydrocarbon group, such as an alkyl group, having 1 to 8, particularly 1 to 4 carbon atoms,;

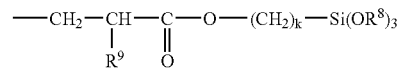

wherein $R^8$ is a monovalent hydrocarbon group, such as an alkyl group, having 1 to 8, particularly 1 to 4, carbon atoms, $R^9$ is a hydrogen atom or a methyl group and k is an integer of from 2 to 10.

In the above formulae, B is a perfluoroalkyl group or a perfluoroxyalkyl group bonded to a silicon atom via an organic group which may have an oxygen atom. Examples of B are as shown below.

wherein g is an integer of from 1 to 20, preferably 2 to 10;

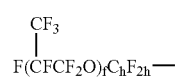

wherein f is an integer of from 1 to 200, preferably 2 to 100, and h is an integer of from 1 to 3.

Each of organosiloxane shown below or a mixture thereof may be used as Component (d), wherein Me represents a methyl group.

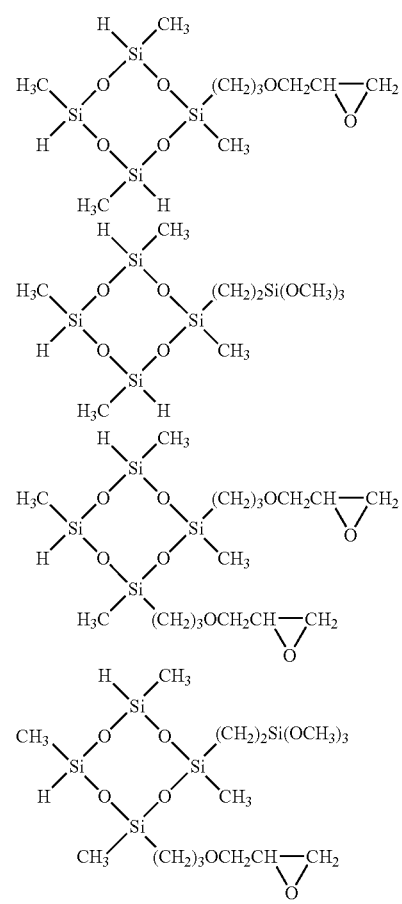

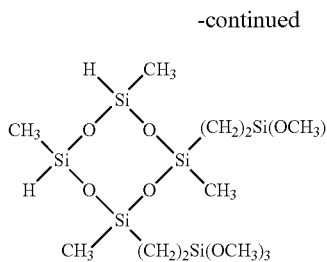
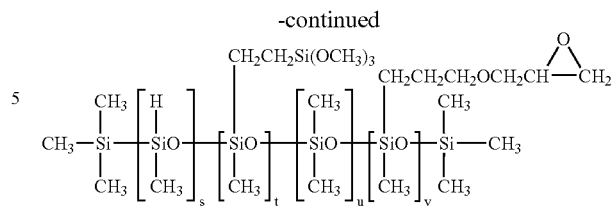
wherein s, u, v are positive integers and t is an integer of 0 or larger.
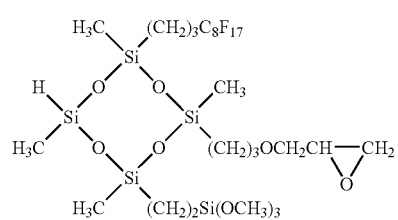
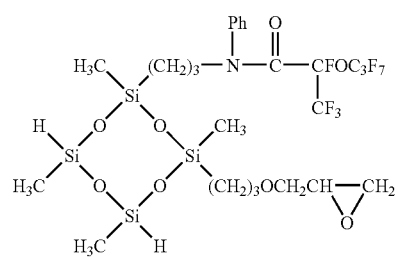
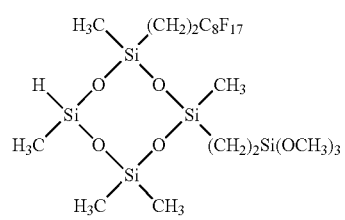
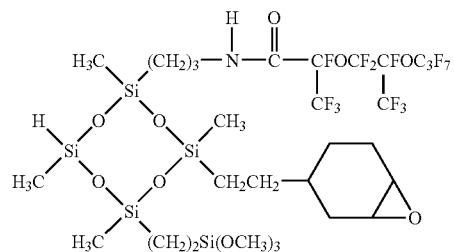
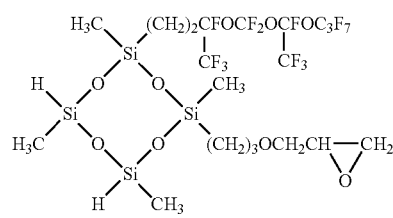
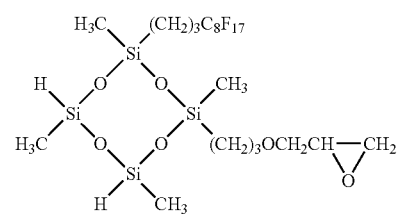
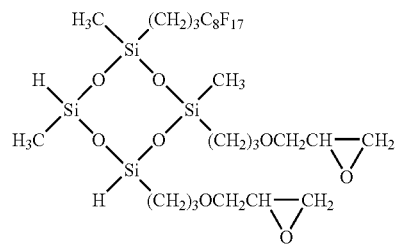
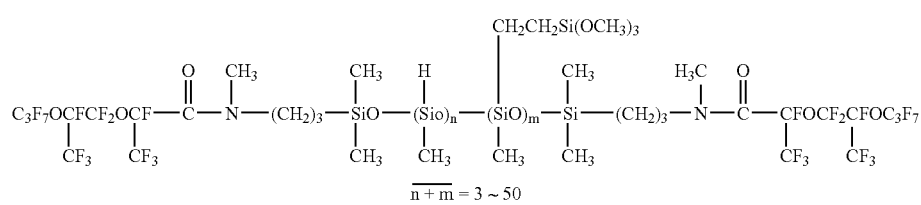

-continued

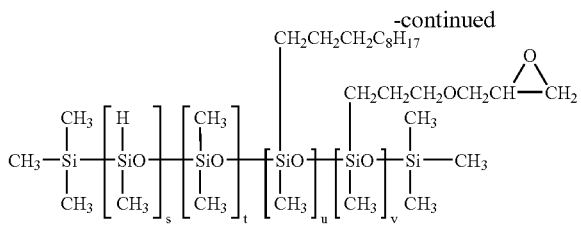

wherein s, u, v and t are as defined above.

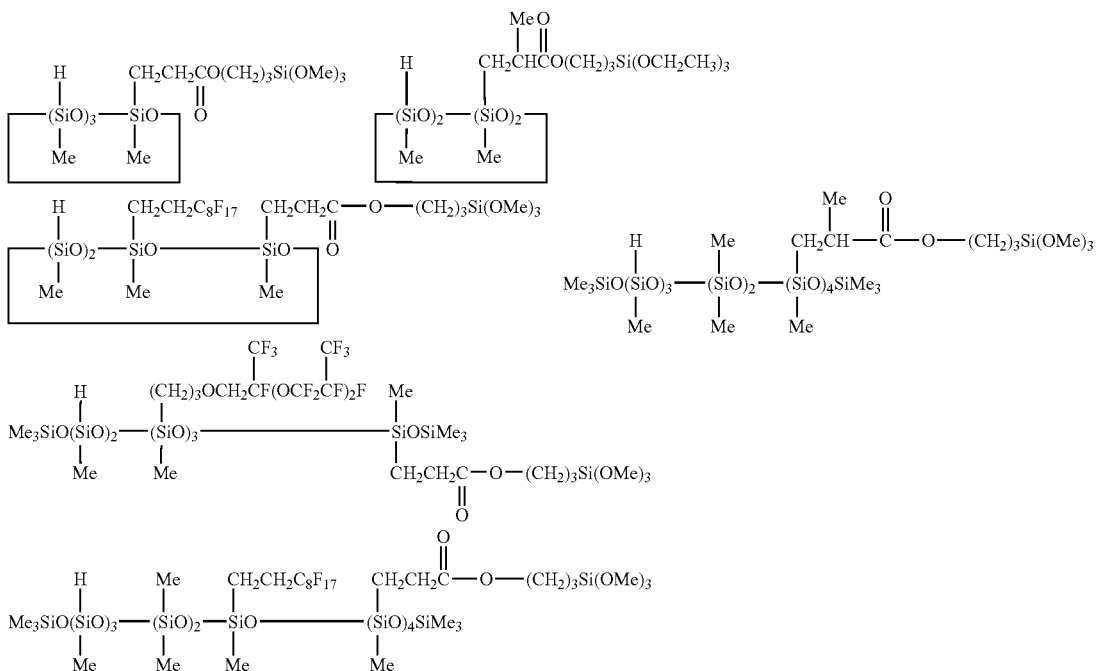

Component (e)

The organic solvent as Component (e) is a compound having a fluorine atom and a boiling point not higher than 150° C. at atmospheric pressure. Component (e) is incorporated in the composition in an amount of from 100 to 10000 parts by weight, preferably 300 to 5000 parts by weight per total 100 parts by weight of the components (a), (b), (c) and (d). If Component (e) is contained below the aforesaid lower limit, a composition may be too thick to apply with ease. If it is contained above the aforesaid upper limit, a concentration of film forming components, that is, a total concentration of (a), (b), (c) and (d), is too low to form a film having a satisfactory strength or adhesion to a substrate.

In the present composition, a stronger adhesion can be attained when the solvent evaporates faster. Therefore, the organic solvent (e) preferably is a highly volatile solvent having a boiling point not higher than 150° C., preferably of from 30° C. to 150° C., more preferably from 50° C. to 100° C. A solvent having a lower boiling point than the aforesaid lower limit may be difficult to handle and makes a shelf life of a composition shorter.

Examples of Component (e) include a hydrochlorofluorocarbon (HCFC) solvent sold under the trade name of AK-225 (56° C.), ex Asahi Glass Co.; hydrofluoroether (HFE) solvents such as those sold under the trade names of AE-3000 (56° C.), ex Asahi Glass Co., Novec HFE-7100 (60° C.), ex Sumitomo 3M Co., and Novec HFE-7200 (78° C.), ex Sumitomo 3M Co.; hydrofluorocarbon (HFC) solvents such as those sold under the trade names of Vertrel XF (55° C.), ex DuPont Co., and ZEORORA-H (79° C.), ex Nihon Zeon Co.; perfluorofluorocarbon (PFC) solvents such as those sold under the trade names of ofFluorinert FC-72 (56° C.), Fluorinert FC-84 (80° C.), and Fluorinert FC-77 (97° C.), all from Sumitomo 3M Co., PF-5060 (56° C.), PF-5070 (80° C.), both from Sumitomo 3M Co., GALDEN SV70 (70° C.), and GALDEN SV90 (90° C.), both from Solvay Solexis Co. Among these, HFE solvents are preferred because they are strong solvent and less harmful to the global environment. In the above, each temperature described in parentheses is a boiling point of each solvent at atmospheric pressure. Other solvent may be used together with Component (e), but a content of Component (e) preferably exceeds 50 wt % based on a total weight of organic solvents.

(f) Optional Components

The present primer composition may optionally contain various kinds of filler to improve mechanical strength, heat resistance, weather resistance, chemical resistance or flame retardancy, or to reduce thermal expansion or gas permeability of a cured product, or to reduce thermal shrinkage during a cure process. Examples of the filler include wood flour, pulp, cotton chip, asbestos, glass fiber, carbon fiber, mica, nut shell powder, rice husk powder, graphite, diatomite, white earth, fumed silica, precipitated silica, silicic acid anhydride, carbon black, calcium carbonate, magnesium carbonate, clay, talc, titanium oxide, ceria, magnesium carbonate, quartz powder, aluminum fine powder, iron oxide, flint powder, and zinc powder and a mixture thereof. Further, the present primer composition may contain various kinds of additives such as antioxidants, radical inhibitors, agents for inactivating metals, antiozonant, and shelf life extending agents, pigments and dyes.

The aforesaid filler may be surface treated. Among the aforesaid filler, fumed silica is preferred because it is dispersed stably in the composition to improve mechanical strength of a cured primer. Particularly, fumed silica treated with a silane surface treatment agent is preferred because of its high dispersibility.

Examples of preferred surface treatment agent include organochlorosilane such as dimethyldichlorosilane, or trimethylchlorosilane; silazane compound such as hexamethyldisilazane; or cyclic silazane such as hexamethyl cyclotrisilazane.

A specific surface area of the treated silica should be 50 $m^2/g$ or larger to improve mechanical strength of a cured composition. It should not exceed 300 $m^2/g$ to prevent difficulty in compounding due to high viscosity.

The hydrophobation treatment is preferably applied directly on the silica fine powder. Any known treatment method can be used. For example, silica powder and a treatment agent are mixed in a sealed mechanical kneader or in a fluidized bed at atmospheric pressure and room temperature or an elevated temperature, optionally in the presence of an inert gas, a catalyst or water to promote hydrolysis, and then the treated silica powder is dried. The treatment agent may be used in an amount not less than that calculated from a surface area the silica powder.

The silica filler preferably has a bulk density of from 30 to 80 g/liter. A silica having a bulk density smaller than the aforesaid lower limit increases a viscosity of a composition too much. A silica having a bulk density larger than the aforesaid higher limit may not strengthen a cured composition enough.

The silica is incorporated in the composition in an amount of from 0.1 to 30 parts by weight per total 100 parts by weight of Components (a) to (d). Preferred amount ranges from 1 to 20 parts by weight to make a stabile dispersion of the silica. It the amount is below the aforesaid lower limit, a sufficient improvement in mechanical strength of a cured composition is not attained. If the amount exceeds the aforesaid higher limit, increases a viscosity of a composition too much.

Preparation of the Composition

The present primer composition may be prepared by mixing Components (a) to (d), and optionally Component (f), with a known mixing means such as a planetary mixer followed by adding Component (e), and then mixing all of the components to make a homogenous mixture. Alternatively, Components (a) to (c) are mixed and heated to allow a part of the components to react, to which Component (d), and optionally Component (f), are added and mixed. The mixture obtained is diluted with Component (f). Accordingly, it should be noted that a primer composition comprising at least a part of Components (a) and (b) in a chemically combined form is also encompassed in the scope of the present invention.

Fluorinated Elastomer

The fluorinated elastomer may be prepared by heat curing, through hydrosilylation reaction, a heat curable composition comprising (i) a polymer having at least two alkenyl groups per molecule and a perfluoro polyether backbone, (ii) a compound having at least two, preferably at least three, SiH bonds per molecule and (iii) a platinum group catalyst. Examples of such elastomer are described in Japanese Patent No. 2990646, Japanese Patent Application Laid-Open No. 11-116684, and Japanese Patent Application Laid-Open No. 2002-12769. The elastomer prepared by heat curing the aforesaid polymer (i) with (iv) an organic peroxide may be used, for example, those described in Japanese Patent Application Laid-Open No. 2000-7835 and Japanese Patent Application No. 2002-001257.

Fluorinated Gel

The fluorinated gel may be prepared by heat curing, through hydrosilylation reaction, a heat curable composition comprising (v) a polymer having at least two alkenyl groups per molecule and a perfluoro polyether backbone, (vi) a polymer having an alkenyl group per molecule and a perfluoro polyether backbone, (vii) a compound having at least two SiH bonds per molecule and (viii) a platinum group catalyst. Examples of such gel are described in Japanese Patent No. 3487744, Japanese Patent Application Laid-Open No. 2002-322362.

Inorganic or Organic Materials

The present primer can be bonded to various kinds of inorganic or organic materials. Examples of inorganic materials include metals such as iron, stainless steel, aluminum, nickel, zinc, gold, silver, and copper; glass, ceramics, cement, slate, stones such as marble and granite, mortar, each of which may be coated with a metal. Examples of the organic materials include acrylic resins, phenolic resins, epoxy resins, polycarbonate resins (PC), polybutylene terephthalate resins (PBT), polyamide resins (PA), polyacetal resins (POM), modified polyphenylene ether resins (PPE), polysulfone resins (PSU), polyether sulfone resins (PEB), polyphenylene sulfide resins (PPS), polyarylate resins (PAR), polyamideimide resins (PAI), polyetherimide resins (PEI), polyether ether ketone resins (PEEK), polyimide resins (PI), and liquid crystalline polymers (LCP). The aforesaid fluorinated elastomer or gel is bonded to the aforesaid various materials via the present primer layer.

Applying Method and Bonding Method

The present primer composition may be applied on a substrate by any conventional method such as brushing, spray coating, wire bar coating, blade coating, roll coating, and dipping. Then, the applied primer is dried usually at room temperature for 1 to 30 minutes, preferably 2 to 15 minutes, and then cured at a temperature of from 50 to 230° C., preferably 150 to 200° C., for 1 to 180 minutes, preferably 5 to 120 minutes to form a cured film. On the cured film, a heat curable fluorinated elastomer or gel composition is applied and heat cured under predetermined conditions, to form a cured layer bonded to the substrate via the primer layer. To bond the gel, the primer composition is not necessarily heat cured. That is, the heat curable gel composition can be applied on a primer layer dried at room temperature for 1 to 30 minutes, preferably 2 to 15 minutes.

Articles

The present primer composition can be applied to various articles for which a fluorinated elastomer or gel is bonded. Examples of the articles include parts of automobiles, chemical plants, ink jet printers, semiconductor production lines, analytical instruments, physical and chemical instruments, medical appliances, aircrafts, fuel cells; materials for coating rolls of a copying machine or moisture proof coating of electric or electronic parts; potting material for sensors; cloth for tents and laminated rubber cloth; and molded articles and extruded articles.

Examples of the automobile parts include diaphragms for fuel regulators, pulsation dampers, oil pressure switches, and for Exhaust Gas Recirculator (EGR); valves for canisters, and power controllers; and seals for oil seals and gaskets for cylinder heads.

Examples of the parts of chemical plants include pump diaphragms, valves, packings, oil seals, and gaskets.

Examples of the parts of ink jet printers or semiconductor production lines include diaphragms, valves, packings and gaskets.

Examples of the parts of analytical instruments or physical and chemical appliances include diaphragms for pumps, packings, valves and joints.

Examples of the parts of aircrafts include face seals for fluid pipes, packings, gaskets, diaphragms and valves. Examples of the parts of fuel cells include seals for electrodes, face seals for hydrogen, air or cooling water, packings, gaskets, diaphragms and valves.

Examples of electric or electronic parts include electronic circuit boards, semiconductor modules, and control units. Examples of sensors include sensors for gas pressure, fluid pressure, temperature, moisture, rotational rate, accelerated velocity, timing, and air flow rate.

By using the present primer composition and a bonding method, adhesion between a heat curable fluorinated elastomer or gel and a substrate is increased to prevent chemicals, solvents, and moisture from penetrating through the interface between the elastomer or gel and the substrate. Consequently, resistance to chemicals, solvents, and moisture of parts prepared by using the present composition is improved.

EXAMPLES

The present invention will be explained with reference to examples, but not limited to those. In the formulae shown below, Me represents a methyl group.

Preparation 1: Preparation of a Heat Curable Fluorinated Elastomer Composition (A)

A heat curable fluorinated elastomer composition was prepared as follows.

One hundred parts by weight of the polymer represented by the following formula (5) having a viscosity of 5,500 mm$^2$/s, a weight average molecular of 15,300, and a vinyl group content of 0.012 mole/100 g and 20 parts by weight of fumed silca, having a specific surface area of 200 m$^2$/g, which had been treated with a mixture of hexametyldisilazane and 1,3-divinyl-1,1,3,3-tetramethyldisilazane were mixed in a planetary mixer and heated to 120° C., and the mixture obtained was further kneaded with a three-roll mill.

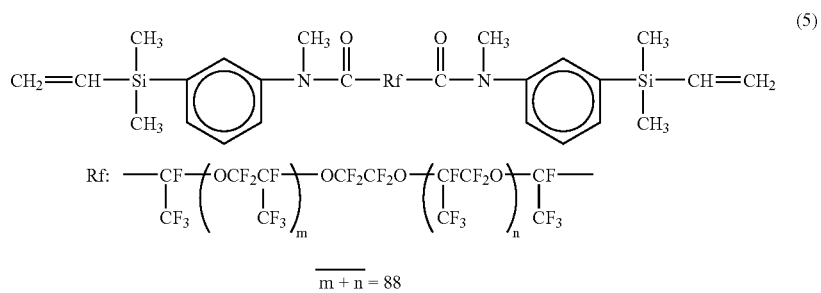

To the mixture thus obtained, 3.36 parts by weight of the fluorine-containing organosiloxane compound represented by the following formula (7),

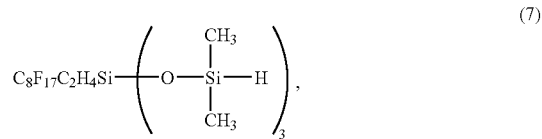

0.2 part by weight of a 0.5 wt % as platinum solution of a chloroplatinic acid modified with $CH_2=CHSiMe_2OSiMe_2CH=CH_2$ in toluene and 0.4 part by weight of a 50% solution of ethynylcyclohexanol in toluene were added and mixed to prepare Composition (A). It was confirmed that Composition (A) was converted to rubber by heating at 150° C. for 10 minutes.

Example 1

One hundred parts by weight of the polymer represented by the following formula (5) having a viscosity of 5,500 mm$^2$/s, a weight average molecular of 15,300, and a vinyl group content of 0.012 mole/100 g and 6 parts by weight of fumed silica, having a specific surface area of 110 m$^2$/g, which had been treated with a dimethyldichlorosilane were mixed in a planetary mixer and heated to 120° C., and the mixture thus obtained was further kneaded with a three-roll mill.

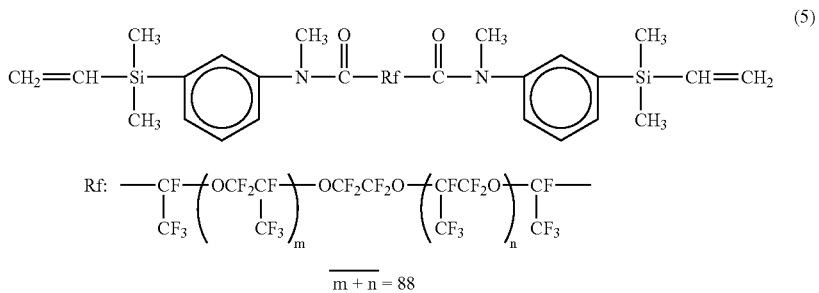

(5)

Rf: —CF—(OCF$_2$CF)$_m$—OCF$_2$CF$_2$O—(CFCF$_2$O)$_n$—CF—
     |     |                              |       |
     CF$_3$ CF$_3$                        CF$_3$  CF$_3$ $\overline{m+n} = 88$ To the mixture thus obtained, 1.04 parts by weight of the fluorine containing organosiloxane compound represented by the following formula (6),

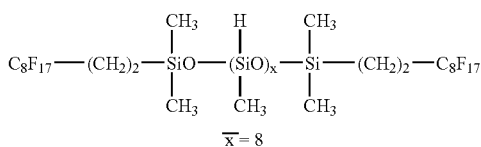

(6)

$\overline{x} = 8$ 1.70 parts by weight of the fluorine containing organosiloxane compound represented by the following formula (8),

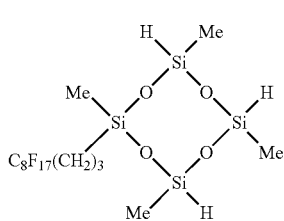

(8)

10.00 parts by weight of the organosiloxane compound represented by the following formula (9),

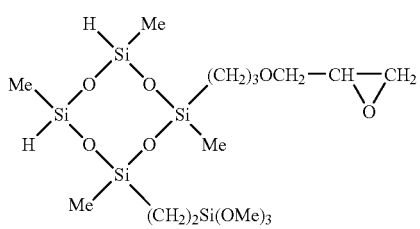

(9)

2.50 parts by weight of the fluorine-containing organosiloxane compound represented by the following formula (10), (10)

[Formula (10) structure shown with Si-O cage containing C$_8$F$_{17}$(CH$_2$)$_3$ and (CH$_2$)$_3$OCH$_2$—CH—CH$_2$ epoxide group]

0.2 part by weight of a 0.5 wt% as platinum solution of a chloroplatinic acid modified with CH$_2$=CHSiMe$_2$OSiMe$_2$CH=CH$_2$ in toluene and 0.4 part by weight of a 50% solution of ethynylcyclohexanol in toluene were added and mixed in a planetary mixer. The mixtuer thus obtained was dispersed homogeneously in 580 parts by weight of HFE-7200, ex Sumitomo 3M Co. to prepare primer composition (I).

Example 2

Primer composition (II) was prepared in the same manner as in Example 1 except that the organosiloxane of the formula (7) was added in an amount of 80.00 parts by weight, HFE-7200 was added in an amount of 1100 parts by weight, and 2.00 parts by weight of 3,3',4,4'-benzophenone tetracarboxylic acid dianhydride fine powder was further added.

Each of the primer composition I and II was applied by a brush on test pieces each with a size of 100 mm×25 mm×2 mm made of aluminum, glass, PBT resin, or epoxy resin. The applied primer was dried at room temperature for 5 minutes, and then heated to 180° C. for 15 minutes.

On the cured primer surface, a mold was placed to make a bead with a size of 100 mm×2 mm×2 mm. In the mold, the fluorinated elastomer composition (A) was injected and heated at 150° C. for 30 minutes. The article thus obtained was subjected to measurement of adhesion strength (N/mm) according to Japanese Industrial Standards K 6854-1 with a 90-degree peeling tester. The results are as shown in Table 1.

Comparative Example 1

The fluorinated elastomer composition (A) was bonded directly on a test piece without applying primer coating.

A mold to make a bead with a size of 100 mm×2 mm×2 mm was placed on each test piece with a size of 100 mm×25 mm×2 mm made of aluminum, glass, PBT resin, or epoxy resin. In the mold, the fluorinated elastomer composition (A) was injected and heated at 150° C. for 30 minutes. The article thus obtained was subjected to an adhesion strength test according to Japanese Industrial Standards K 6854-1 with a 90-degree peeling tester. The results are as shown in Table 1.

TABLE 1

| Substrate | Example 1 [Primer Composition (I)] | Example 2 [Primer Composition (II)] | Comparative Example 1 [Without primer] |
|---|---|---|---|
| SUS304 | 2.8*[1] Rubber rupture*[2] | 2.5 Rubber rupture | 0.1 Peeled |
| Aluminum | 2.9 Rubber rupture | 2.7 Rubber rupture | 0.1 Peeled |
| Glass | 2.7 Rubber rupture | 2.7 Rubber rupture | 0.1 Peeled |
| PBT resin | 2.6 Rubber rupture | 2.4 Rubber rupture | 0.1 Peeled |
| Epoxy resin | 2.7 Rubber rupture | 3.0 Rubber rupture | 0.2 Peeled |

*[1] In N/mm.
*[2] The elastomer was ruptured.

Preparation of a Heat Curable Fluorinated Gel Composition (B)

Thirty six parts by weight of the polymer represented by the aforesaid formula (5) having a viscosity of 5,500 mm$^2$/s, an weight average molecular weight of 15,300, and a vinyl group content of 0.012 mole/100 g, 39 parts by weight of the polymer represented by the following formula (11) having a viscosity of 650 mm$^2$/s, 25 parts by weight of the polymer represented by the formula (12), 0.15 part by weight of a 50% solution of ethynylcyclohexanol in toluene, 0.015 part by weight of a 3.0 wt %, as platinum metal, solution of chloroplatinic acid complex with vinyl siloxane in ethanol, and 18.5 parts by weight of the compound represeted by the following formula (13) were mixed to prepare Composition (B).

It was confirmed that the composition (B) was converted to gel by heating at 150° C. for 1 hour. A one-quater scale cone penetration of the gel was measured to be 69 according to ASTM D-1403.

Preparation of a Heat Curable Fluorinated Gel Composition (C)

To the gel composition (B), 1.0 part by weight of the organosiloxane compound represented by the following formula (14) and 0.5 part by weight of the organosiloxane compound represented by the following formula (15), both as adhesion-enhancing components, were added and mixed to prepare a heat curable fluorinated gel composition (C).

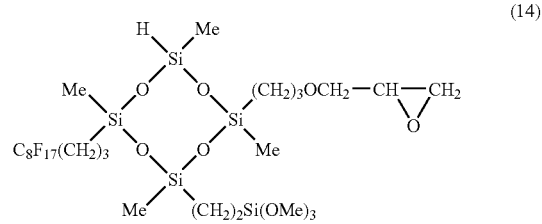

(14)

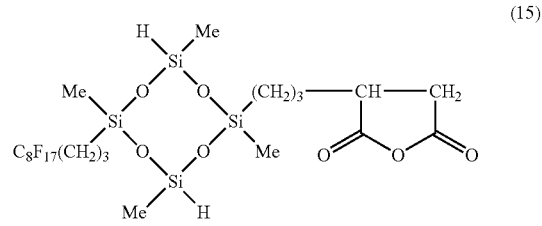

(15)

It was confirmed that the composition (C) was converted to gel by heating at 150° C. for 1 hour. A one-quater scale cone penetration of the gel was measured to be 45 according to ASTM D-1403.

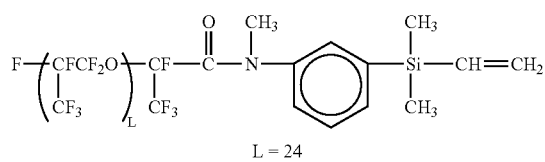

(11)

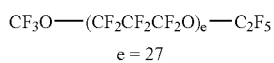

(12)

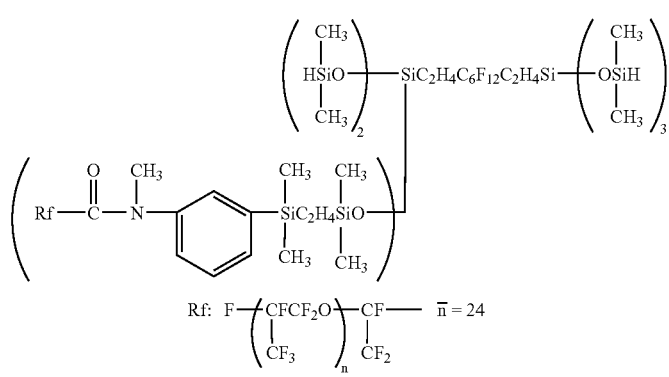

(13)

Examples 3-1 and 3-2

Figure 2:
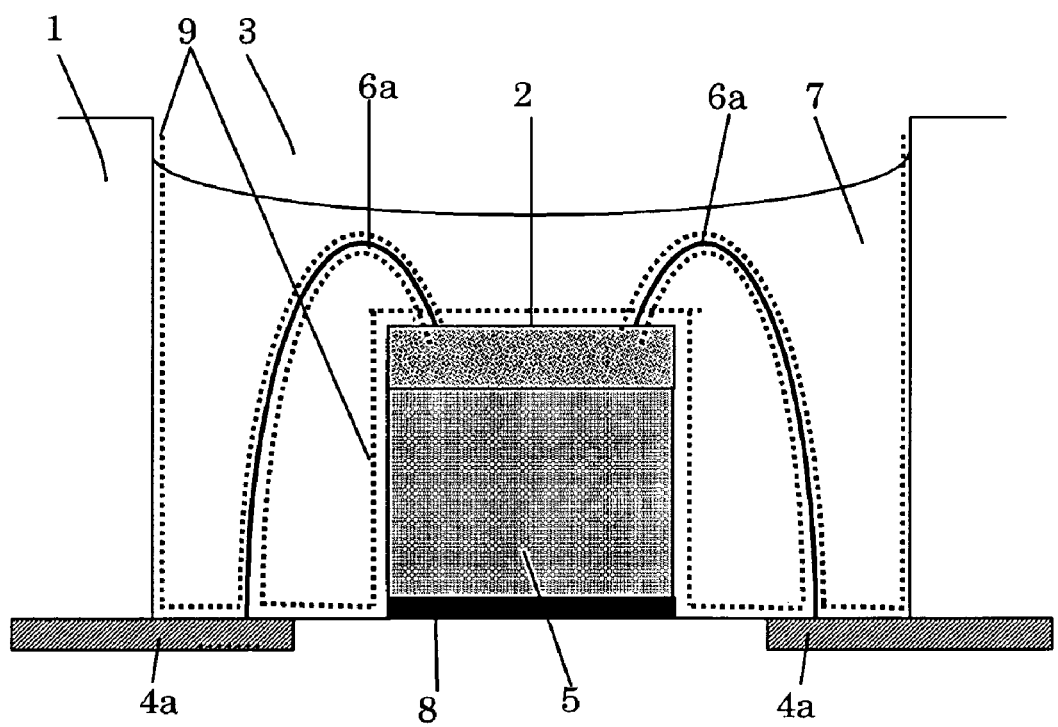
FIG. 2 is a cross sectional view of the electronic part prepared in Examples 3-1 and 4-1.
Figure 3:
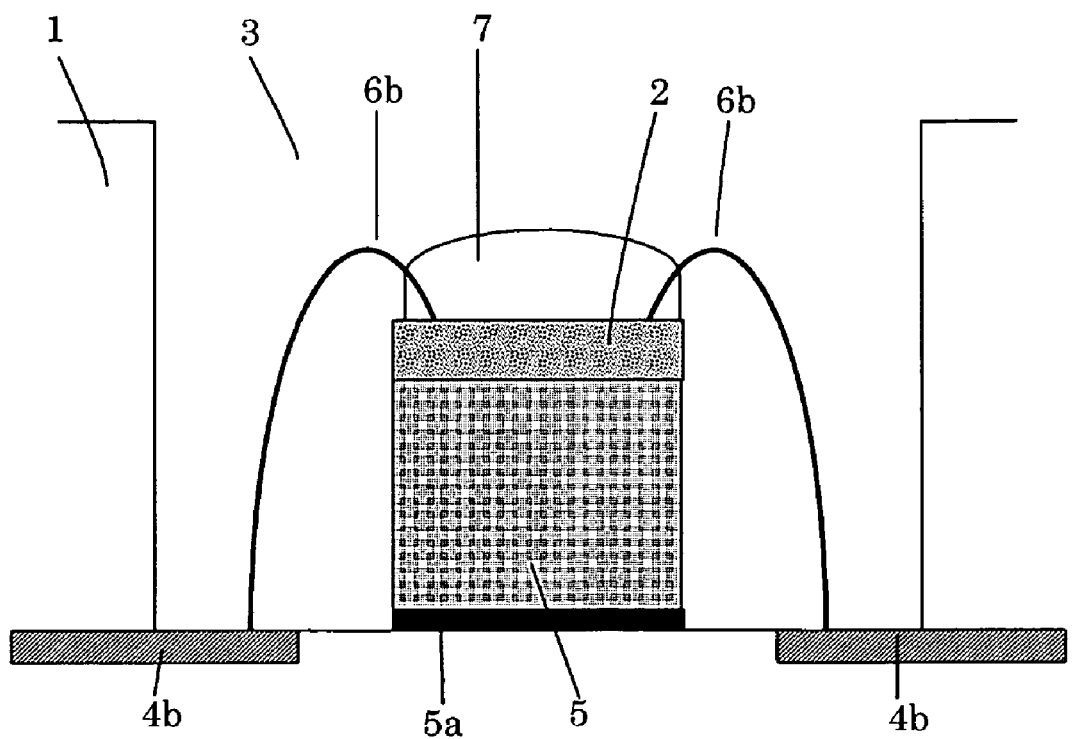
FIG. 3 is a cross sectional view of the electronic part prepared in Comparative Example 2-2.

An electronic part 1, as shown in FIG. 2, comprising a housing 1 with cavity 3, a base 5, aluminum insert pins 4a, a comb electrode 2 mounted on base 5, and aluminum bonding wires 6a was prepared. The primer composition (I) was applied to the portion 9 as shown in broken lines in FIG. 2 and dried. Then, the aforesaid gel composition (B) was poured to the portion 7 and cured at 150° C. for 1 hour to encapsulate the part inside the cavity 3. The encapsulated part as shown in FIG. 1 was soaked in a 50% aqueous solution of sulfuric acid at 60° C. for 500 hours. Then, the part was taken out and visually observed whether the gel was peeled off or not. Subsequently, the gel was removed and the part was visually observed whether there was any corroded part. The results are as shown in Table 2.

Figure 4:
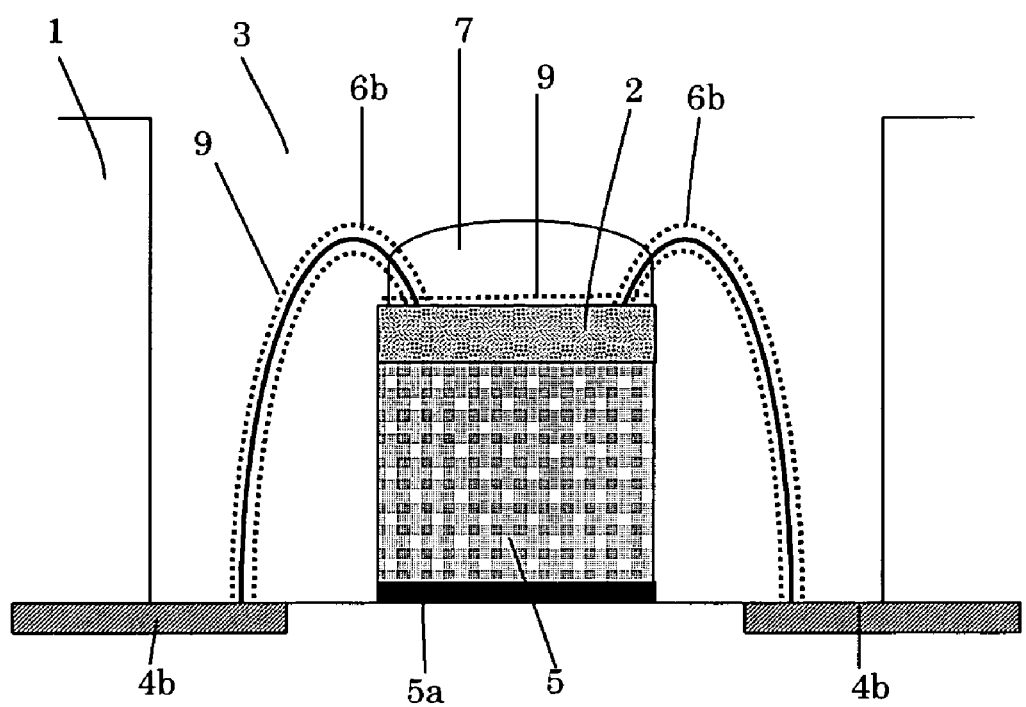
FIG. 4 is a cross sectional view of the electronic part prepared in Examples 3-2 and 4-2.

The same procedure as above was repeated to prepare a part 2 comprising a housing 1, a base 5, golden insert pins 4b, a comb electrode 2 mounted on base 5, and golden bonding wires 6b as shown in FIG. 4 except that the primer composition (I) was applied to the portion 9 shown with dotted lines, and the gel composition (A) was applied only on the portion 7 on the comb electrode 2.

Examples 4-1 and 4-2

The procedure in Example 3-1 and 3-2 were repeated except that the primer composition (II) was used instead of the primer composition (I).

Comparative Examples 2-1 and 2-2

The procedures in Example 3-1 and 3-2 were repeated except that the primer composition (I) was not applied.

Comparative Examples 3-1 and 3-2

The procedures in Comparative Example 2-1 and 2-2 were repeated except that the composition (C) was used instead of the composition (B)

TABLE 2

Observation Results for Electronic Part 1

|  | | Example 3-1 | Example 4-1 | Com. Ex*. 2-1 | Comp. Ex 3-1 |
|---|---|---|---|---|---|
| Gel composition | | B | B | B | C |
| Primer composition | | I | II | None | None |
| Adhesion to parts | | Good | Good | Peeled | Good |
| Corrosion | Electrode 2 | None | None | Corroded | None |
|  | Wires 6a | None | None | Corroded | None |
|  | Lead 4a | None | None | Corroded | None |

*The term "Comp. Ex." stands for Comparative Example.

TABLE 3

Observation Results for Electronic Part 2

|  | Example 3-2 | Example 4-2 | Com. Ex. 2-2 | Comp. Ex 3-2 |
|---|---|---|---|---|
| Gel composition | B | B | B | C |
| Primer composition | I | II | None | None |
| Adhesion to Electrode 2 | Good | Good | Peeled | Good |
| Corrosion of Electrode 2 | None | None | Corroded | None |

Example 5

The composition (B) cured at 150° C. for 1 hour was aged in the air at 120° C. After for 500 hours, one-quater scale cone penetration was measured according to ASTM D-1403. The result is shown in Table 4, wherein a smaller value indicates greater hardness.

Comparative Example 4

The composition (C) cured at 150° C. for 1 hour was aged in the air at 120° C. After for 500 hours, one-quater scale cone penetration was measured according to ASTM D-1403. The result is shown in Table 4.

TABLE 4

Changes in Penetration

|  |  | Example5 | Comp. Ex. 4 |
|---|---|---|---|
|  | Gel composition | B | C |
| Penetration | Initial | 69 | 45 |
|  | After 120° C. × 500 hours | 65 | 20 |

Discussion

In the parts of Examples 3-1, 3-2, 4-1 and 4-2, the gel is firmly bonded to the electronic elements such as the housing 1 via the primer, so that the sulfuric acid was prevented from penetrating through an interface between the gel and the part. On the other hand, in the parts of Comparative Examples 2-1 and 2-2, the gel stuck to the components mainly through the tackiness of the gel, so that the sulfuric acid penetrated through the interface to corrode the parts.

With the adhesion-enhancing components, i.e., the organosiloxane compounds represented by the formulae (14) and (15), the gel prepared from composition (C) adhered to the electronic elements to prevent penetration of the sulfuric acid. However, the gel showed significant change in the needle penetration, indicating stiffening by aging. If such a gel is used as an adhesive in an article, adhered portions may become brittle or shrink to cause change in size. In contrast, the gel bonded by the present primer composition, the initial hardness was maintained even after the aging.

The invention claimed is:
1. A method of bonding a fluorinated elastomer or a fluorinated gel to an inorganic or organic material comprising a step of
   (1) applying a primer composition comprising the following components (a) to (e) on a surface of the inorganic or organic material:
      (a) 100 parts by weight of a linear perfluoro polyether compound having at least two alkenyl groups per molecule, a perfluoro polyether backbone having repeating units represented by the formula,

—$C_aF_{2a}O$—, wherein a is an integer of from 1 to 6, and a weight average molecular weight of from 5,000 to 100,000,
(b) a fluorine-containing organosiloxane compound having one or more fluorine atoms and at least two SiH bonds per molecule, in such an amount that the molar ratio of the SiH bond in the organosiloxane compound to the alkenyl group in Component (a) ranges from 0.8 to 5.0,
(c) a catalytic amount of a hydrosilylation catalyst,
(d) 12.5 to 100 parts by weight of an organosiloxane compound having, per molecule, at least one SiH bond and at least one epoxy group and/or trialkoxysilyl group bonded to a silicon atom of said organosiloxane via an organic group which may have an oxygen atom, and
(e) 100 to 10000 parts by weight, per total 100 parts by weight of said components (a), (b), (c) and (d), of an organic solvent having a fluorine atom and a boiling point of not higher than 150° C. at atmospheric pressures, (2) drying or curing the applied primer composition,
(3) applying a heat curable fluorinated elastomer composition or a heat curable fluorinated gel composition on the dried or cured primer composition, and
(4) curing the applied heat curable fluorinated elastomer or gel composition.

2. The bonding method according to claim 1, wherein the perfluoro polyether backbone of the linear perfluoro polyether compound (a) is represented by the formula, —$(C_aF_{2a}O)_q$—, wherein q is an integer of from 20 to 600.

3. The bonding method according to claim 1, wherein the linear perfluoro polyether compound (a) is represented by the following formula (1),

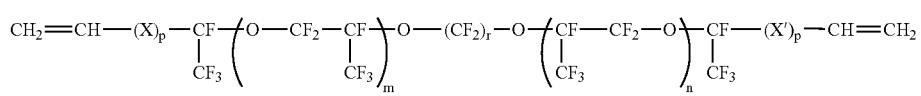

wherein X may be the same or different from each other and is a group represented by the formula, —$CH_2$—, —$CH_2O$—, —$CH_2OCH_2$— or —Y—$NR^1$—CO—, wherein Y is a methylene group or an o-, m-, or p-dimethylsilylphenylene group represented by the following formula (Z) and $R^1$ is a hydrogen atom, a methyl, a phenyl or an allyl group,

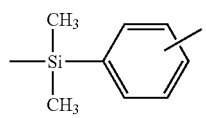

X' may be the same or different from each other and is a group represented by the formula, —$CH_2$—, —$OCH_2$—, —$CH_2OCH_2$ or —CO —$NR^2$—Y'—, wherein Y' is a methylene group or an o-, m-, or p-dimethylsilylphenylene group represented by the following formula (Z) and $R^2$ is a hydrogen atom, a methyl, a phenyl or an allyl group,

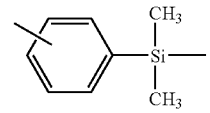

p may be the, same or different from each other and is an integer of 0 or 1, r is an integer of from 2 to 6, m and n are integers of from 0 to 600 with a sum of n and m ranging from 20 to 600.

4. The bonding method according to claim 1, wherein the organosiloxane compound having one or more fluorine atom (b) has at least one perfluoroalkyl, perfluoroxyalkyl, perfluoroalkylene or perfluoroxyalkylene group and at least two SiH bonds per molecule.

5. The bonding method according to claim 1, wherein the organic solvent (e) is selected from the group consisting of hydrochlorofluorocarbon solvents, hydrofluoroether solvents, hydrofluorocarbon solvents, and perfluorofluorocarbon solvents.

6. The bonding method according to claim 1, wherein the heat curable fluorinated elastomer composition comprises (i) a polymer having at least two alkenyl groups per molecule and a perfluoro polyether backbone, (ii) a compound having at least two SiH bonds per molecule and (iii) a platinum group catalyst.

7. The bonding method according to claim 1, wherein the heat curable fluorinated elastomer composition comprises (i) a polymer having at least two alkenyl groups per molecule and a perfluoro polyether backbone and (iv) an organic peroxide.

8. The bonding method according to claim 1, wherein the heat curable fluorinated gel composition comprises (v) a polymer having at least two alkenyl groups per molecule and a perfluoro polyether backbone, (vi) a polymer having an alkenyl group per molecule and a perfluoro polyether backbone, (vii) a compound having at least two SiH bonds per molecule and (viii) a platinum group catalyst.

9. The bonding method according to claim 1, wherein the inorganic material is selected from the group consisting of metals, glass, ceramics, cement, slate, marble, granite, mortar, each of which may be coated with a metal.

10. The bonding method according to claim 1, wherein the organic material is selected from the group consisting of acrylic resins, phenolic resins, epoxy resins, polycarbonate resins, polybutylene terephthalate resins, polyamide resins, polyacetal resins, modified polyphenylene ether resins, polysulfone resins, polyether sulfone resins, polyphenylene sulfide resins, polyarylate resins, polyamideimide resins, polyetherimide resins, poiyether ether ketone resins, polyimide resins, and liquid crystalline polymers.

* * * * *